Dec. 6, 1938.    A. F. JIMENEZ ET AL    2,139,591
SHOCK ABSORBER
Filed Nov. 23, 1937    3 Sheets-Sheet 1
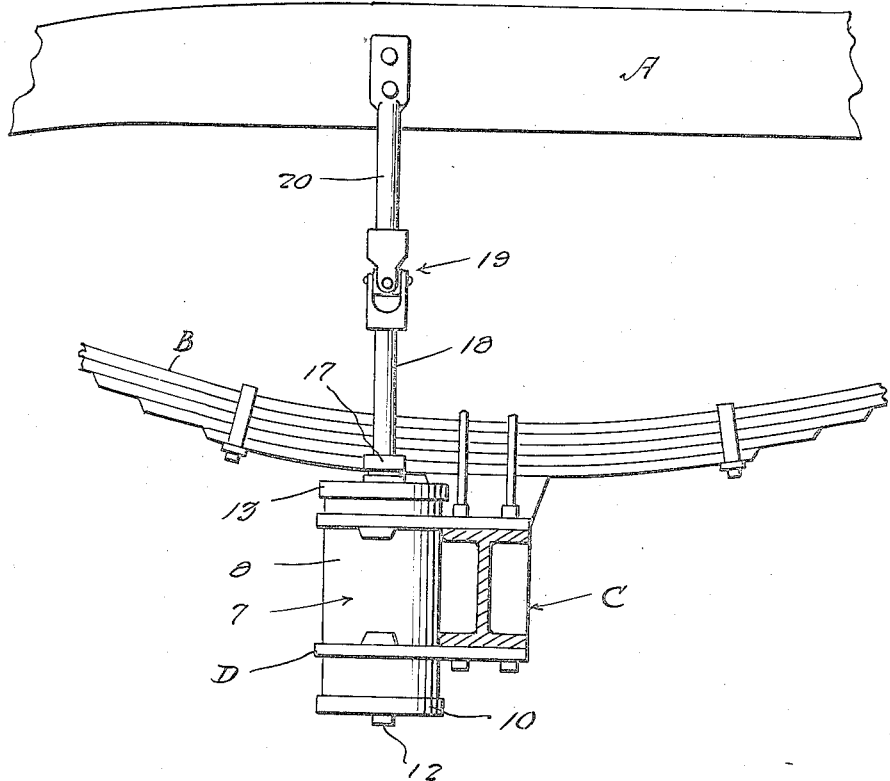
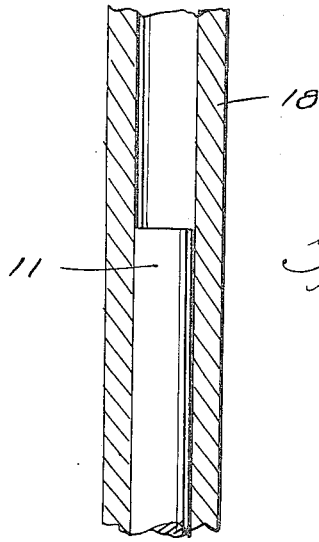
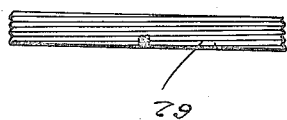
Inventors
Artemio Fernandez Jimenez
Pablo Duarte Bello
By
Attorneys

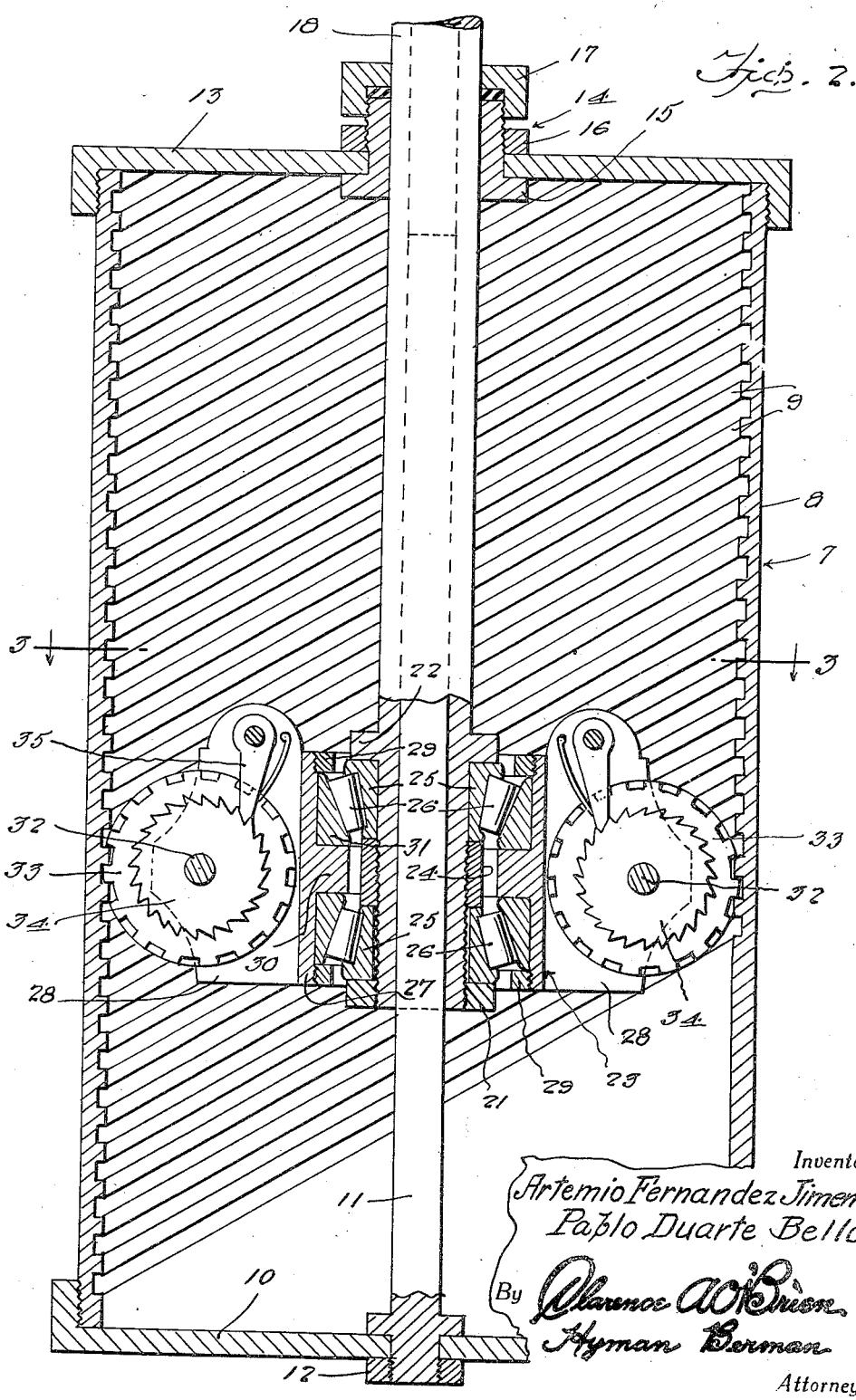

Dec. 6, 1938.  A. F. JIMENEZ ET AL  2,139,591
SHOCK ABSORBER
Filed Nov. 23, 1937   3 Sheets-Sheet 3

Inventors
Artemio Fernandez Jimenez
Pablo Duarte Bello

By Clarence A. O'Brien
Hyman Berman
Attorneys

Patented Dec. 6, 1938

2,139,591

UNITED STATES PATENT OFFICE 2,139,591

SHOCK ABSORBER

Artemio Fernandez Jimenez and Pablo Duarte Bello, Habana, Cuba

Application November 23, 1937, Serial No. 176,138

4 Claims. (Cl. 188—129)

As the title of this invention implies, the invention here for consideration has to do with what is believed to be, a structurally new and distinct shock absorber of a type which lends itself to dependable and efficient use in connection with motor vehicles, the structure being especially adapted for attachment to an axle adjacent the leaf spring as well as attachment to the superposed portion of the chassis.

Designed for complete stabilization, the improved structure selected is so fashioned as to transform the lineal motion produced by the elliptical spring when relaxing from a compressed to its original shape into helicoidal motion such as may be uniform or variable, slow and progressive.

Resembling in some respects, a dash-pot arrangement, the specific embodiment is characterized by a fixedly mounted cylinder cooperable with the axle and spring and a reciprocating piston having a rotary head operable in a manner to retard the upward or withdrawal stroke of the pistons and to utilize this relatively slow return as a means to off-set violent spring rebound.

Features and advantages in addition to those indicated above, will become more readily apparent from the following description and accompanying illustrative drawings.

In the drawings, wherein like numerals are employed to designate like parts throughout the various views:

Figure 1 is a partial assembly view disclosing a portion of the chassis frame, the spring and axle there-beneath and the improved shock absorber adjoined to the respective parts.

Figure 2 is an enlarged fragmentary view, partly in section and partly in elevation showing the piston and cylinder construction and association.

Figure 5 is a fragmentary detail view showing the telescoping association of the tubular piston rod and guide stem therefor.

Figure 6 is a view of one of the nuts for holding an outer race in the circular body.

Figure 3:
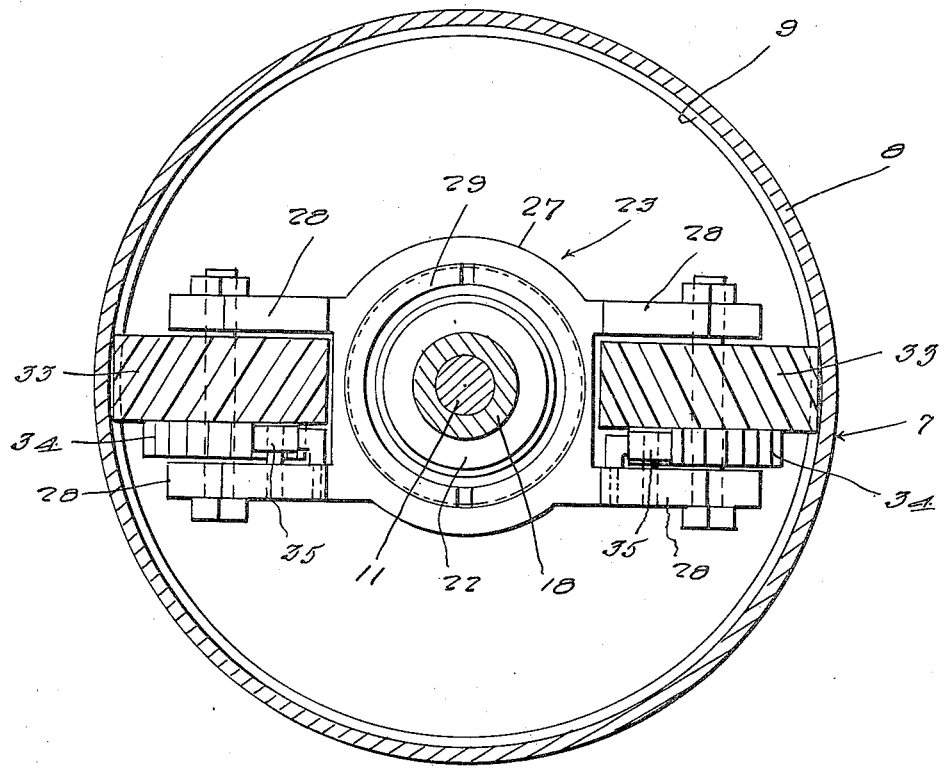
Figure 3 is a horizontal section on the line 3—3 of Figure 1 looking in the direction of the arrows.

Referring now to the drawings, it will be observed that the vehicle chassis is denoted at A, while the underlying multiple leaf or semi-elliptical spring is indicated at B. This is clamped on the associated axle C. Any suitable means indicated at D is employed to maintain the cylinder 7 in place.

Reference being had to the construction of the cylinder as disclosed in Figure 2 it will be observed that the cylindrical shell 8 is internally threaded with spiral threads 9 of predetermined pitch. The bottom cap 10 is centrally apertured to accommodate the flanged retention end of a centrally disposed perpendicular guide rod 11. This part 11 is maintained in place by a retaining nut 12 whereby to facilitate assembling and promote repair. The guide rod rises to a point just below the central portion of the top cap or closure 13. At this point attention is directed to the numeral 14 which designates a combined gland and guide. The guide bushing is indicated at 15, this being held in place by retaining nut 16 and the bushing being threaded to accommodate a packing cup 17. These parts provide an ideal substantially frictionless passage and guide for the tubular piston rod 18. The upper end of the rod is connected by what may be called a universal joint 19 to an adapter bracket 20 carried by the chassis A. This selection and arrangement is merely utilized to take care of the relative movement between the spring and chassis and is of no material consequence insofar as the real novelty (see Figure 2) is concerned.

The tubular piston rod telescopes over the fixedly mounted guide rod 11. The lower end thereof is threaded to accommodate a retaining nut 21. Above the nut and formed integral with the rod is an outstanding abutment flange 22. This arrangement of features provides for the accommodation of a bearing assembly which in turn serves to accommodate the reciprocating and rotating piston head here unitarily denoted by the numeral 23. That is to say, there is a ring nut 24 on the threaded part just described, and this together with nut 21 and the shoulder 22 serves to accommodate races 25 designed to accommodate the conical roller bearings 26.

The piston or plunger head is characterized by a circular body or collar 27, this being provided on diametrically opposite sides with outstanding parallel lugs or ears 28. Threaded into the opposite ends of the collar are ring nuts 29 which cooperate with the central partition or divider 30 in accommodating the remaining or outer bearing races 31. Thus, the piston head is in effect a roller bearing equipped freely rotatable carriage unit. It is designed to move downwardly with the piston rod without rotating but its movement in the opposite direction is axial or rotary in relation to the piston rod.

Figure 4:
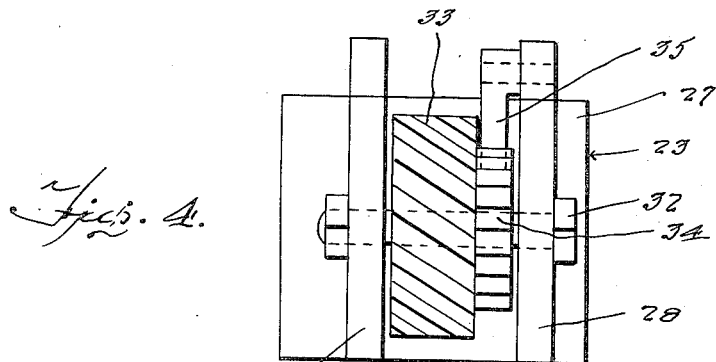
Figure 4 is an end elevational view of the combined reciprocating and rotating carriage or piston head.

To accomplish this, we have found it advisable to employ the ratchet and gearing arrangement depicted to advantage in Figures 3 and 4. The arrangement is the same on each side of the piston head or carriage and a description of one device will serve to cover both. Reference being had to Figure 4, it will be noted that an axle 32 is mounted between the vertical parallel ears 28. Mounted on this is a spiral toothed gear 33. Formed integral with the gear is a ratchet wheel 34 and associated with the teeth of the ratchet is a spring pressed retention pawl 35 pivotally mounted between the upper portion of said ears.

As is evident from the assembly view in Figure 2, the pawl and ratchet mechanism is such as to allow the gears 33 to roll freely on their axes during the downward motion or descent of the so-called piston head. Retrograde rotation of the gears, however, is prevented, but due to their coaction with the spiral threads they are moved in an orbital path to provide the desired progressive retardation of the outward or upward movement of the piston as a unit. Incidentally, in practice, it is desired to charge the cylinder with a lubricant of proper fluidity.

In operation it is understood that when the car is at rest the so-called piston head or gear carriage is at the top of the cylinder. When the associated vehicle wheel strikes an obstacle and the coordinated spring is put under stress or compression, the tendency to straighten out causes the housing or cylinder to rise in a perpendicular direction. This in turn, causes the piston as a unit to recede into the upcoming cylinder. This inward rectilinear motion of the piston is not hindered by the then idling style gears. That is to say, the pawl and ratchet mechanism does not interfere with this downward stroke of the piston. When however, the car spring gradually resumes its normal position again, the separation of plunger and cylinder is obviously retarded. At this time the pawl and ratchet mechanism comes into play to lock the gears to the carriage unit. Thus, the gears and carriage become a rotary head with the gears traveling or revolving in an orbital path. The coaction of the gear teeth and spiral threads produces this result, and the result in turn provides the desired shock absorbing action.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

We claim:

1. In a structure of the class described, in combination, an axle, a spring mounted on said axle, a cylinder fixedly mounted on said axle adjacent the spring, a chassis disposed above the axle and spring, a bracket attached to and depending from the chassis, a plunger rod pivotally adjoined to said bracket and projecting into said cylinder, said cylinder having a spiral thread on its internal wall, a head located in the cylinder and rotatably arranged on the rod, a worm gear rotatably supported by the head and having its teeth engaging the spiral thread of the cylinder and ratchet means for the gear permitting rotary movement of the gear when the head moves downwardly and preventing such rotary movement of the gear when the head moves upwardly.

2. In a device of the class described, a cylinder having an internal spiral thread, a rod extending into the cylinder for reciprocatory movement, a head rotatably arranged on the rod and located in the cylinder, a worm gear rotatably carried by the head and having its teeth engaging the spiral thread and means for holding the gear against rotary movement when the head moves in one direction and permitting the gear to rotate when the head moves in an opposite direction.

3. In a device of the class described, a cylinder having an internal spiral thread, a rod extending into the cylinder for reciprocatory movement, a head rotatably arranged on the rod and located in the cylinder, a worm gear rotatably carried by the head and having its teeth engaging the spiral thread and means for holding the gear against rotary movement when the head moves in one direction and permitting the gear to rotate when the head moves in an opposite direction, said means including a ratchet wheel connected with the gear and a spring pressed dog carried by the head and engaging the ratchet wheel.

4. In a device of the class described, a cylinder having a spiral thread on its internal wall, a reciprocatory rod extending into the cylinder, a head rotatably arranged on the rod and located in the cylinder, oppositely arranged worm gears rotatably supported by the head and having their teeth engaging the thread of the cylinder and ratchet means for preventing rotary movement of the gears when the head moves in one direction and permitting rotary movement of such gears when the head moves in an opposite direction.

ARTEMIO FERNANDEZ JIMENEZ.
PABLO DUARTE BELLO.